Patented Jan. 24, 1950

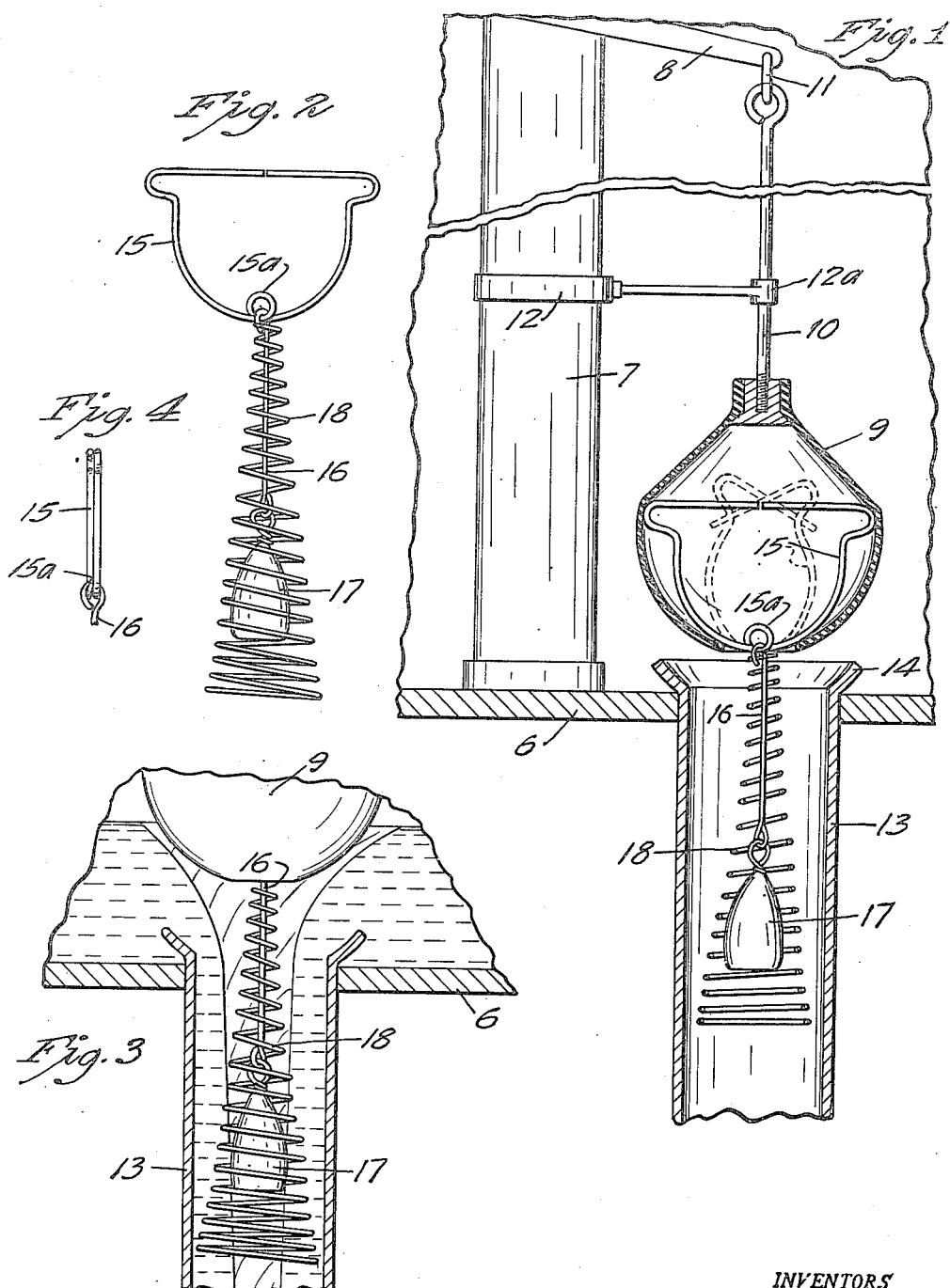

2,495,616

UNITED STATES PATENT OFFICE 2,495,616

GUIDE FOR BALL VALVES

Gertrude S. Vilandré and Emile J. Vilandré, Brooklyn Center, Minn.

Application July 31, 1948, Serial No. 41,784

2 Claims. (Cl. 4—56)

This invention relates to guides for ball valves for insuring the centering of the valve ball in its seat.

In conventional home toilets a flush tank is provided in which a vertically shiftable hollow rubber ball valve is provided to control the flow of water from said tank. The guiding mechanism for this ball will at times permit the same to be laterally displaced so as not to centrally seat itself in the valve seat provided at the top of the outlet conduit, thus causing leakage and wasting of water. In the case of the home owner having a cesspool or septic tank sewage system this constant flow of water therein will soon fill up said system and necessitate repairs and cleaning out thereof long before it would otherwise be necessary.

It is an object of our invention to provide a novel and improved highly efficient guide adapted to be attached in depending relation to a vertically shiftable valve ball of a ball valve to stabilize said ball and positively center the same relative its valve seat.

It is another object to provide a guide adapted to be attached in depending relation to a ball valve for controlling the flow of liquid from a reservoir through an orifice into a vertically disposed portion of a conduit whereby the swirling whirlpool action of the water flowing through said orifice centers said guide and thereby centers said valve relative its seat to assure efficient operation thereof.

More specifically, it is an object to provide a depending pendulum guide adapted to be attached to a vertically operable ball valve for centering the same in its seat and having a conical helical element concentrically mounted on said pendulum for aiding the whirlpool action centering said pendulum to center said valve ball in its seat.

These and other objects and advantages of our invention will more fully appear from the following description made in connection with the accompanying drawings wherein like reference characters refer to similar parts throughout the several views and in which:

Fig. 1 is a vertical sectional view taken substantially through the center of the outlet conduit and valve mechanism and showing our improved guide as attached thereto in full lines and showing the attachment element in retracted position in dotted lines;

Fig. 2 is a side elevational view of our valve guiding device;

Fig. 3 is a fragmentary enlarged vertical section taken substantially through the center of the outlet conduit showing our improved device in operation; and Fig. 4 is a fragmentary end elevational view of the attachment element.

A portion of a conventional flush tank 6 with an overflow standpipe 7 and a valve operating mechanism 8 for operating the rubber valve ball 9 is shown in Fig. 1. The valve ball 9 is connected with the operating mechanism 8 as by the vertically disposed rod 10 and linkage 11 at the top of said rod 10. A guide 12 fixed to said standpipe 7 in outstanding relation thereto and having the guiding sleeve 12a slidably surrounding rod 10 conventionally serves as the only guide for the valve ball 9. An outlet conduit 13 is connected in the bottom of tank 6 and the valve seat 14 is concentrically formed at the top thereof. The conduit 13 is vertically disposed at the upper portion thereof and the function of this vertical position will be subsequently brought out. The rubber valve ball 9 is hollow and has an aperture in the extreme bottom thereof. In the conventional operation of the flush tank the valve 9 is lifted from its seat 14 by the operating mechanism 8 and floats downwardly on the surface of the water which flows out through the conduit 13. The guiding sleeve 12a is the only guiding means provided on conventional tanks and does not always serve to hold the valve ball 9 in vertical alignment with the valve seat 14, and thus the valve is permitted to be laterally displaced and therefore not centrally seat itself in the seat 14.

To remedy this problem we have provided a guide adapted to be attached to the bottom of a ball 9 and depend therefrom into the upper vertical portion of outlet conduit 13. Our guide has a resilient mounting attachment 15 which is adapted to be retracted, as shown in the dotted position in Fig. 1, and inserted through the aperture in the bottom of the ball 9. After insertion of the element into the hollow ball 9, the arms thereof expand and engage the inside portions of said ball as shown by the full lines of Fig. 1. The bottom of attachment element 15 has a connection loop 15a to which a pendulum arm 16 is swingably attached. An element adapted to offer resistance to the flow of water through said conduit such as the pendulum 17 is swingably connected to the bottom of arm or link 16 and additional resistance is supplied by a conical helical spring 18 concentrically mounted around said arm and said pendulum. The spring 18 may be attached at the top to the upper portion of link 16 as is shown in the drawings or it may merely be slidably mounted around the link 16 and weight 17, the diminished upper portion thereof retaining said spring on said pendulum. It is possible to use other elements which offer slight resistance to the flow of water in order to forcibly seat said ball 9 in its valve seat 14. An important feature of our invention is resistance to the flow of water to produce downwardly directed seating force on said valve ball 9.

When the ball 9 is raised vertically to open the valve, the water rushes out through conduit 13 and, due to the rotation of the earth on its axis, forms a swirling whirlpool which is materially increased by the helical shape of spring 18. This whirlpool, best shown in Fig. 3, serves to center the pendulum weight 17 and thus positively centers the ball 9 and draws the same downwardly to be received in its valve seat 14. The spring 18 aids the whirlpool action as well as stabilizing the weight 17 and offering additional resilient resistance to the flow of water through the conduit. The ball 9 of course has sufficient buoyancy to float regardless of the slight additional weight of our improved guiding device and operates in substantially the conventional manner as previously described with the exception that it is positively centered and drawn into its valve seat 14 when the water has been drained from the tank 6.

It will be seen that we have provided an extremely simple and inexpensive, yet highly efficient valve guide which can be used on a vertically operated ball valve for controlling the flow of liquid from a reservoir where the outlet conduit has a vertically disposed portion immediately therebelow. The spring 18 stabilizes the pendulum 17 and imparts to the water additional whirlpool action which is normally caused by the rotation of the earth. The weight 17 serves to draw the ball downwardly as well as centering the same in its seat 14. The force of the water on the spring and the pendulum also serves to draw the ball downwardly in addition to positively centering the pendulum 17 within conduit 13.

It will of course be understood that various changes may be made in the form, details, arrangement, and proportions of the parts without departing from the scope of our invention.

What we claim is:

1. For use with a ball valve and cooperating valve seat in a vertically disposed portion of a liquid flow conduit, a guide for centering said ball in said seat, comprising a weighted pendulum with an elongated arm adapted to be swingably attached to the lower central portion of said ball in depending relation thereto, a helical element surrounding said pendulum and, at least, a portion of said arm, means for attaching said pendulum to said ball, the helical element increasing the natural whirlpool swirling action of the liquid in said conduit to center said pendulum in said conduit and guide said ball into said seat.

2. The structure set forth in claim 1, said helical element being substantially conical in shape with the bottom thereof flared outwardly to stabilize said pendulum in said conduit.

GERTRUDE S. VILANDRÉ.
EMILE J. VILANDRÉ.

REFERENCES CITED

The following references are of record in the file of this patent:

UNITED STATES PATENTS

| Number | Name | Date |
| --- | --- | --- |
| 2,155,902 | Kass | Apr. 25, 1939 |
| 2,171,447 | Heath | Aug. 29, 1939 |
| 2,222,856 | Robertson et al. | Nov. 26, 1940 |
| 2,230,613 | Deady | Feb. 4, 1941 |
| 2,372,848 | Owens | Apr. 3, 1945 |